United States Patent [19]

Regnault et al.

[11] 4,255,295

[45] Mar. 10, 1981

[54] PROCESS FOR THE REGENERATION OF POLYMER FROM WASTE

[75] Inventors: Bernard Regnault, Roussillon; Pierre Revol, Villeurbanne, both of France

[73] Assignee: Rhone-Poulenc-Textile, Paris, France

[21] Appl. No.: 80,298

[22] Filed: Oct. 1, 1979

[30] Foreign Application Priority Data

Oct. 18, 1978 [FR] France .................................. 78 30260

[51] Int. Cl.³ .............................................. B29C 29/00
[52] U.S. Cl. ...................................... 260/2.3; 528/502
[58] Field of Search ................. 260/2.3; 264/204, 205; 528/502

[56] References Cited

U.S. PATENT DOCUMENTS 4,143,001  3/1979  Raab et al. ............................. 260/2.3

Primary Examiner—Theodore E. Pertilla
Attorney, Agent, or Firm—Stevens, Davis, Miller & Mosher

[57] ABSTRACT

A process is disclosed for the production of a polymer of good spinnability from waste. It consists in compressing the finely chopped waste by means of a screw until a bulk density of at least 500 kg/m³ is reached, introducing same into a double screw degassing extruder, and subjecting the molten polymer to a post-condensation operation. The polymer obtained can be used as such in many textile applications and in plastics.

5 Claims, No Drawings

PROCESS FOR THE REGENERATION OF POLYMER FROM WASTE

This invention relates to a new process which makes it possible to obtain polymer of good spinnability from waste yarns, sheets, textiles, or plastics made of fusible synthetic polymers.

For some years, the increase in the price of raw materials has compelled numerous users of synthetic polymers to study the recovery of waste closely. Thus, various articles describing processes for the recovery of waste have appeared, which include those of J. K. L. Bajaj, in Fiber Producer, April 1977, pages 30 et seq., and of R. H. Wagner, in Chemiefasern Textil Industrie, June 1977, pages 543 et seq. However, these authors describe processes which essentially comprise the chopping and melting of the waste, but which give rise to a degree of degradation of the polymers. It is for this reason that the polymers recovered are used in admixture with new polymer and in proportions which do not exceed 10% of the total weight of polymer when they are to be spun. Similar comments apply to French Application No. 2,378,622, published on Aug. 25, 1978.

The present invention relates to a process for the production, from waste of low bulk density,* of a polymer having a sufficient viscosity for the use for which the recovered polymer is intended, characterized in that the waste is finely chopped, compressed by means of a screw until a bulk density of at least 500 kg/m$^3$ is reached, then introduced in this form into a double screw degassing extruder in which it is melted whilst the traces of water and of various volatile impurities are removed, and the molten polymer is then subjected to a post-condensation operation under reduced pressure in order to raise its intrinsic viscosity to the desired value and to decompose the non-volatile impurities to give volatile products which are removed under the reduced pressure.

*NDLR or low apparent density

The process according to the present invention is particularly suitable for treating waste consisting or consisting essentially of poly-(polymethylene terephthalate) and polymethylene terephthalate copolymers and, in particular, the polymers and copolymers of ethylene terephthalate or butylene terephthalate.

The expression "material of very low bulk density" is understood as meaning materials having a bulk density of less than 100 kg/m$^3$, for example of the order of 50 to 100 kg/m$^3$. Such materials are in the form of waste films, sheets, textiles or plastics made of fusible synthetic polymers, more particularly those made of poly-(polymethylene terephthalate) or polymethylene terephthalate copolymers.

To carry out the process according to the present invention, the finely chopped waste is compressed until a bulk density of at least 500 kg/m$^3$, preferably 600 kg/m$^3$, is reached, by means of any suitable device, and in particular by means of the device described in the French patent application No. 78/30259 by the assignee company for a "Device for Feeding an Extruder with a Material of Very Low Bulk Density", the disclosure of which is incorporated herein by reference. In addition to means for the introduction and discharge of the waste polymeric material, this latter device comprises a feed and compression zone consisting of a cylindrical part followed by a part of decreasing diameter, in the shape of a truncated cone, in which an endless screw rotates, the envelope of which exactly matches the shape of the said feed and compression zone, and the shaft of which rests upstream against a spring.

Under the action of the endless screw, the compressed waste is introduced into a double screw degassing extruder, in which it is melted whilst the traces of water and of various volatile impurities are removed. The extruder used is preferably a double screw extruder comprising a first feed zone in which a first degassing device is located, which makes it possible to remove a high proportion of the vapors and gases to be removed, for example about 90%. The extruder also comprises a melting zone, a zone for kneading the molten material and, finally, a degassing and compression zone. The temperature of these various zones is preferably about 300° C. In the kneading zone, the screws can advantageously be replaced by a series of plates of pseudotriangular shape, which are mounted on the shaft so as to be staggered relative to one another.

On leaving the extruder, the molten polymer is subjected to one or more filtering stages, depending on the final purity desired, and it is then sent into an autoclave where it is subjected to a post-condensation in a liquid medium, under reduced pressure, by known means. This operation is carried out in an autoclave at a temperature of 280°–285° C. and under a reduced pressure of 2 to 5 mm Hg. Since the molten material still contains traces of the catalyst used for its polycondensation during the manufacture of the original polymer, it is unnecessary to add any catalyst at this stage.

During this polycondensation, the intrinsic viscosity of the polymer is increased until it reaches a sufficient value for the use for which the recovered polymer is intended. Thus, depending on the origin of the waste used, it is possible to start, for example, from a polyethylene terephthalate having an intrinsic viscosity of 0.60, or even less, and to obtain a product having an intrinsic viscosity of 0.67 or more. Moreover, under the conditions of this polycondensation, the non-volatile impurities, which have not theretofore been removed in the preceding stages, are decomposed to give volatile products which are removed under the action of the reduced pressure.

A polymer which is virtually entirely free from its various impurities, namely water, oil and sizes, is thus obtained, whether these impurities be volatile or non-volatile.

In contrast to the polymers obtained by the hitherto known processes for the recovery of waste polymeric materials, this polymer possesses both a sufficient degree of polymerization and a sufficient purity to be used in valuable applications such as textile products or plastics. It is very particularly suitable for spinning nonwoven webs or wadding fiber for stuffing eiderdowns, pillows, bolsters, and the like. In contrast to the polymers obtained by the direct regeneration processes known hitherto, the polymer produced by the regeneration process according to the present invention can be used for such purposes as these without the addition of any new polymer, and this considerably reduces the cost of these products.

The following example is given in order still further to illustrate the invention but without in any way limiting it:

EXAMPLE

An 800 mm long press screw is used which comprises a 500 mm cylindrical part and a 300 mm part in the shape of a truncated cone, the diameter of which decreases from 160 to 100 mm. The screw possesses a uniform pitch of 100 mm along its entire shaft and can move along its axis against a return spring.

Waste, sized polyethylene terephthalate fibers, which are finely chopped and which have a density of 100 kg/m$^3$ and an intrinsic viscosity of 0.60, are introduced through a funnel at the rate of 100 kg/hour. The waste passes into the press screw, where it is compressed to about 600 kg/m$^3$, and then into a double screw extruder (distance between axes 83 mm) comprising a 480 mm feed zone, at 300° C., possessing a degassing funnel, a 790 mm melting zone, at 300° C., a 125 mm kneading zone, at 300° C., and, finally, a 350 mm compression zone, at 285° C., possessing a degassing funnel.

The molten material leaving the extruder passes into a first filter possessing a filtration threshold of 500μ, and then into a pump and a second filter having a filtration threshold of 100μ, before being sent into an autoclave where it is treated at 285° C. under a pressure of 3.5 mm Hg.

A polyester having an intrinsic viscosity of 0.67 is then obtained with an output of 100 kg per hour. It is then extruded in the form of rods which are cooled in water and ground into granules which are ready for use.

The resulting polymer is spun by itself, without adding any new polymer thereto, by known means for the production of non-woven webs. Webs of very good quality are obtained which are completely comparable to the webs obtained with new polymer.

What is claimed is:

1. A process for the production of a poly-(polymethylene terephthalate) polymer of good spinnability from waste of low bulk density containing poly-(polymethylene) terephthalate, characterized in that the said waste is finely chopped, compressed by means of a screw until a bulk density of at least 500 kg/m$^3$ is reached, then introduced in this form into a double screw degassing extruder in which it is melted whilst the traces of water and of volatile impurities are removed, and the molten polymer then is subjected to a post-condensation operation under reduced pressure thereby raising its intrinsic viscosity to the desired value and decomposing the non-volatile impurities to give volatile products which are removed under the reduced pressure.

2. A process according to claim 1, characterized in that the molten polymer is subjected to at least one filtration between its discharge from the extruder and the post-condensation operation.

3. A process according to claim 1 or 2 characterized in that the extruder comprises a feed and degassing zone, a melting zone, a kneading zone, and a zone for degassing and compressing the polymeric material.

4. A process according to claim 3, characterized in that the various zones of the extruder are maintained at a temperature of about 300° C.

5. A process according to claim 1, wherein the said bulk density is about 600 kg/m$^3$.

* * * * *